United States Patent [19]
Cody

[11] Patent Number: 5,551,334
[45] Date of Patent: Sep. 3, 1996

[54] PASTEURIZER

[75] Inventor: Daniel J. Cody, Prairie du Sac, Wis.

[73] Assignee: DEC International, Inc., Madison, Wis.

[21] Appl. No.: 315,229

[22] Filed: Sep. 29, 1994

[51] Int. Cl.⁶ .................. A23B 4/00; A23B 4/03
[52] U.S. Cl. .................. 99/470; 99/483; 99/484; 34/208; 34/216
[58] Field of Search .................. 99/470, 483, 484, 99/443 C, 362, 517; 198/484.1, 803.13, 817; 34/477, 480, 82, 208, 216, 217

[56] References Cited

U.S. PATENT DOCUMENTS

| | | | |
|---|---|---|---|
| 2,282,187 | 5/1942 | Herold et al. | 99/362 |
| 2,948,619 | 8/1960 | Ashley | 99/470 |
| 3,254,426 | 6/1966 | Lamb et al. | 34/216 |
| 3,289,814 | 12/1966 | Rosema | 198/803.13 |
| 3,961,569 | 6/1976 | Kenyon et al. | 99/470 |
| 4,281,465 | 8/1981 | Zimmermann et al. | 34/477 |
| 4,291,472 | 9/1981 | Lewis | 99/483 |
| 5,097,755 | 3/1992 | Hill | 99/484 |
| 5,143,199 | 9/1992 | Evans | 198/484.1 |
| 5,213,196 | 5/1993 | Wolf | 198/803.13 |

*Primary Examiner*—David Scherbel
*Assistant Examiner*—Reginald L. Alexander
*Attorney, Agent, or Firm*—Andrus, Sceales, Starke & Sawall

[57] ABSTRACT

A meat product pasteurizer (20) includes a first conveyor (21) transporting an already-cooked and packaged meat product (22) to a loading station (24), a pasteurizing processing chamber (26) including a fluid media heating zone (28), a void zone (30), and a fluid media chilling zone (32), a second conveyor (60) transporting the meat product (22) from the loading station (24) through the heating zone (28), then through the void zone (30), then through the chilling zone (32) to an unloading station (62), a third conveyor (64) transporting the meat product (22) from the unloading station (62) to a blow-off station (66) for removing surface fluid from the packaged meat product (22). The second conveyor (60) has a plurality of flights (68) formed by paddles (70) defining variable width pockets (76) receiving the food product, the pockets (76) having a first width (78) during the conveyor run between the loading (24) and unloading (62) stations, the pockets (76) having second wider widths (80) at the loading and unloading stations. The paddles (70) have various orientations, allowing processing of differing size food products. The blow-off station (66) has a plurality of parallel longitudinally extending belts (200) transporting the food product (22) along a longitudinal run (201) and having a continuous longitudinal extension along such run without lateral cross-belts. Recirculation of blow-off air, and reclamation of fluid, is provided.

20 Claims, 8 Drawing Sheets

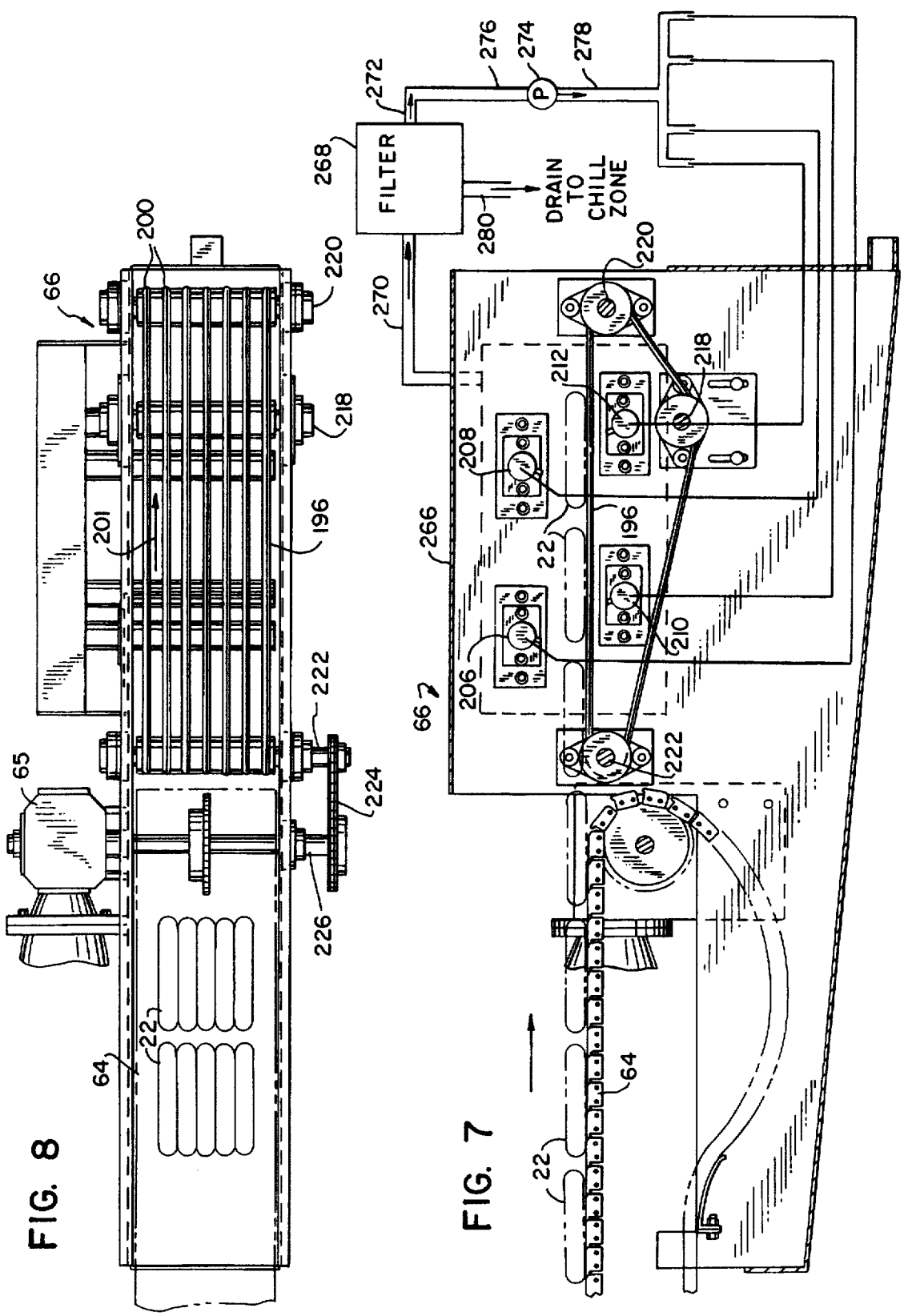

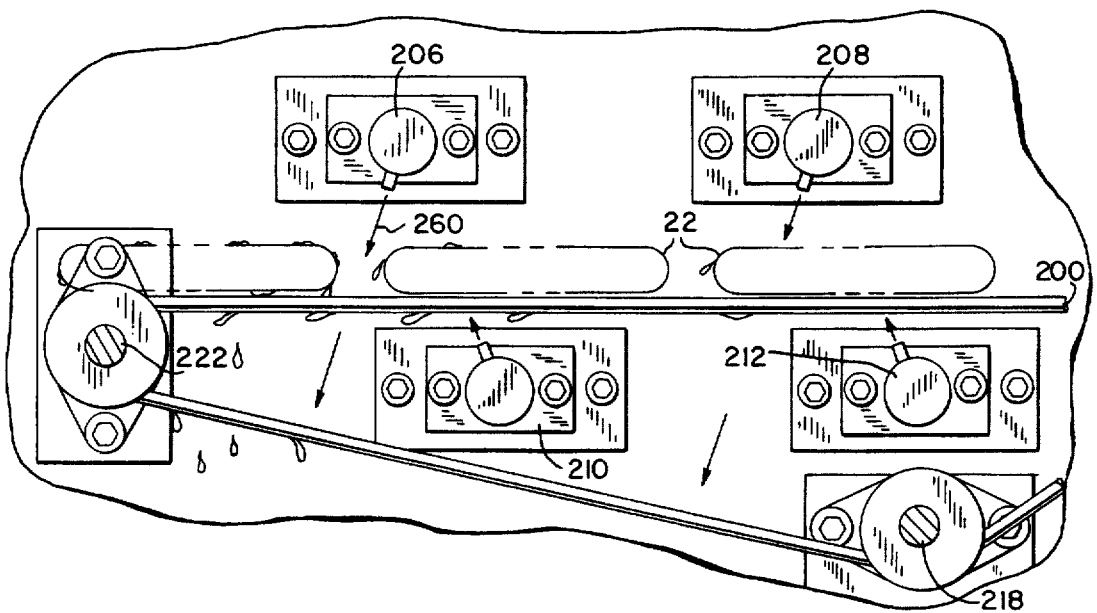
FIG. 9
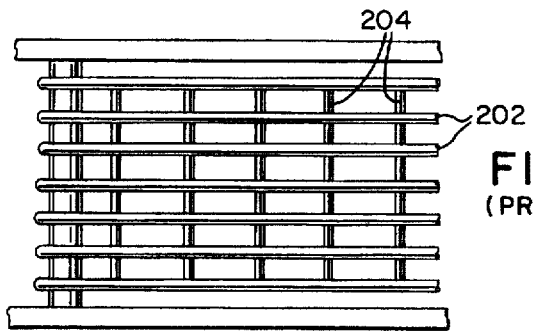
FIG. 10
(PRIOR ART)
FIG. 11
(PRIOR ART)
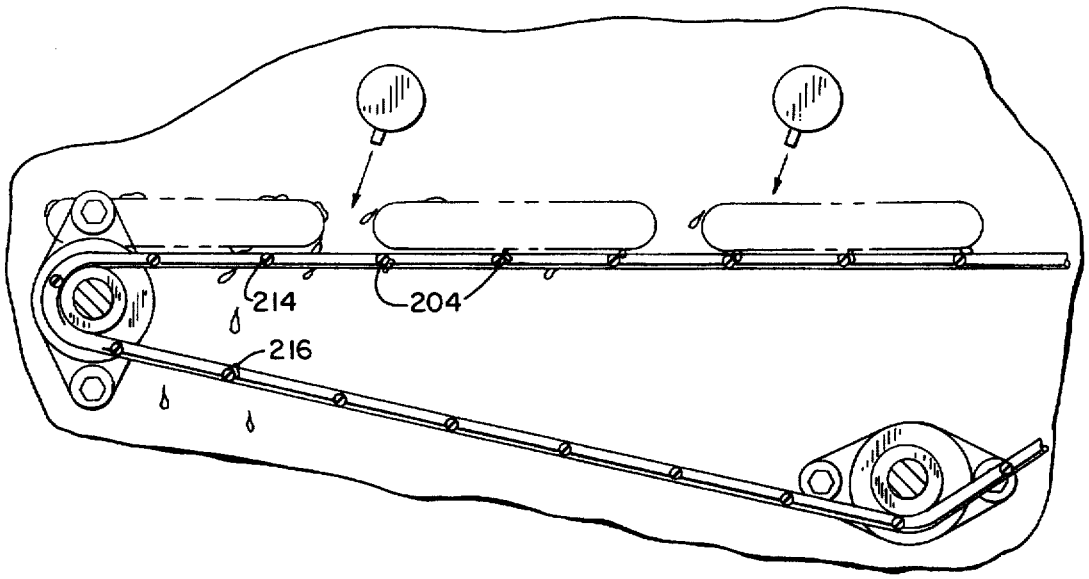

FIG. 15
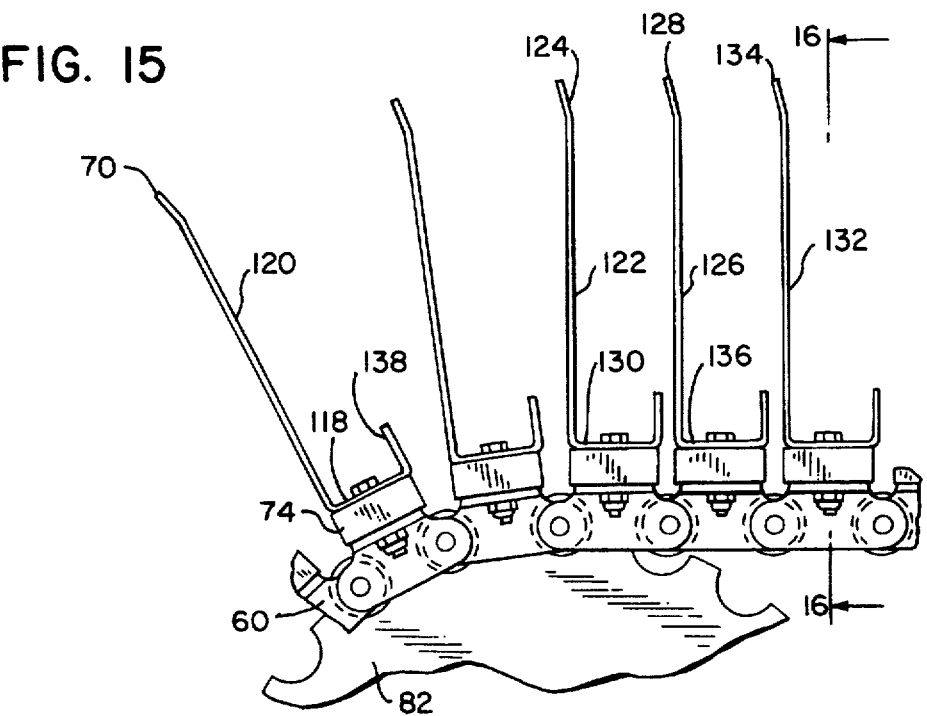
FIG. 17
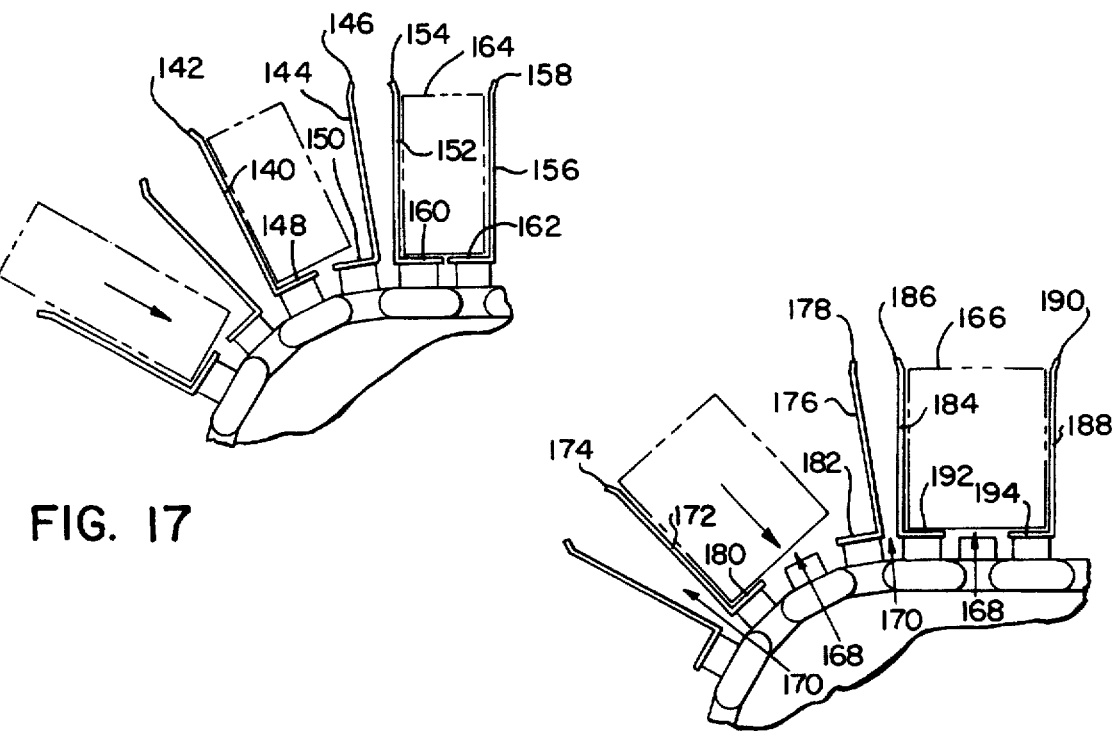
FIG. 18

1
PASTEURIZER

BACKGROUND AND SUMMARY

The invention relates to food processing systems, and more particularly to a pasteurizer for cooked packaged meat products, such as hot dogs, hams, etc.

In the cooked, packaged meat product industry, there is growing consideration of the possible benefits of pasteurizing. These benefits include eliminating bacteria on the surface of the packaged meat product, and extending shelf life. The present invention provides a pasteurizing system for cooked, packaged meat products. Various aspects of the invention have further applications beyond meat product pasteurizers.

BRIEF DESCRIPTION OF THE DRAWINGS

FIG. 7 is an end view, partially cut away, of the blow-off station downstream from the unloading station.

FIG. 8 is a top view of a portion of the structure of FIG. 7.

FIG. 9 is an enlarged view of a portion of the structure of FIG. 7.

FIG. 10 is a view like a portion of FIG. 8 and illustrates the prior art.

FIG. 11 is a view like FIG. 9 and illustrates the prior art.

FIG. 15 is an enlarged view of a portion of the structure of FIG. 1 at the loading station.

FIG. 17 is a view like a portion of FIG. 15 and shows an alternate embodiment.

FIG. 18 is like FIG. 17 and shows another alternate embodiment.

DETAILED DESCRIPTION

Figure 1:
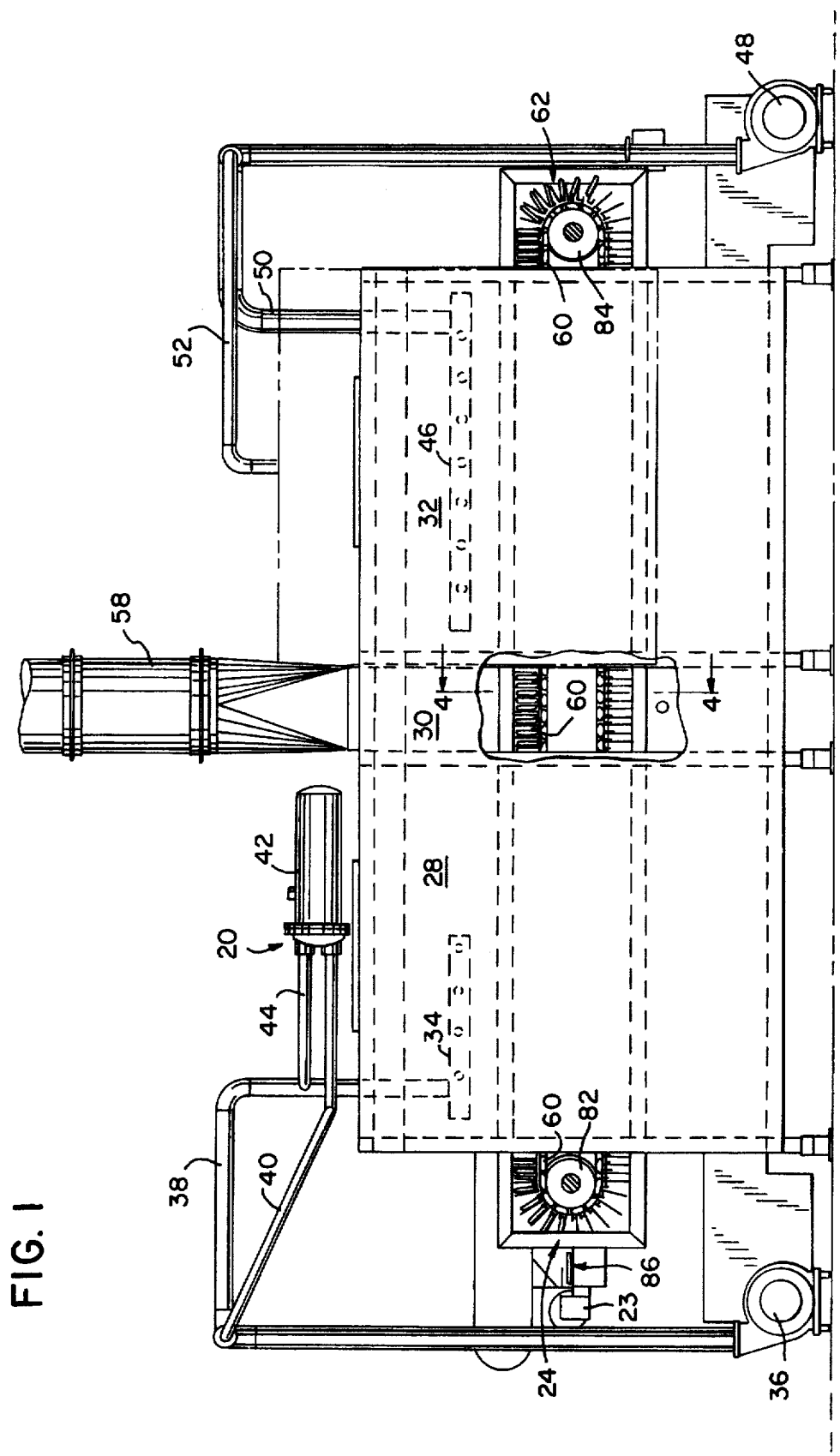
FIG. 1 is a side elevation view, partially cut away, of a meat product pasteurizer and food processing system in accordance with the invention.
Figure 2:
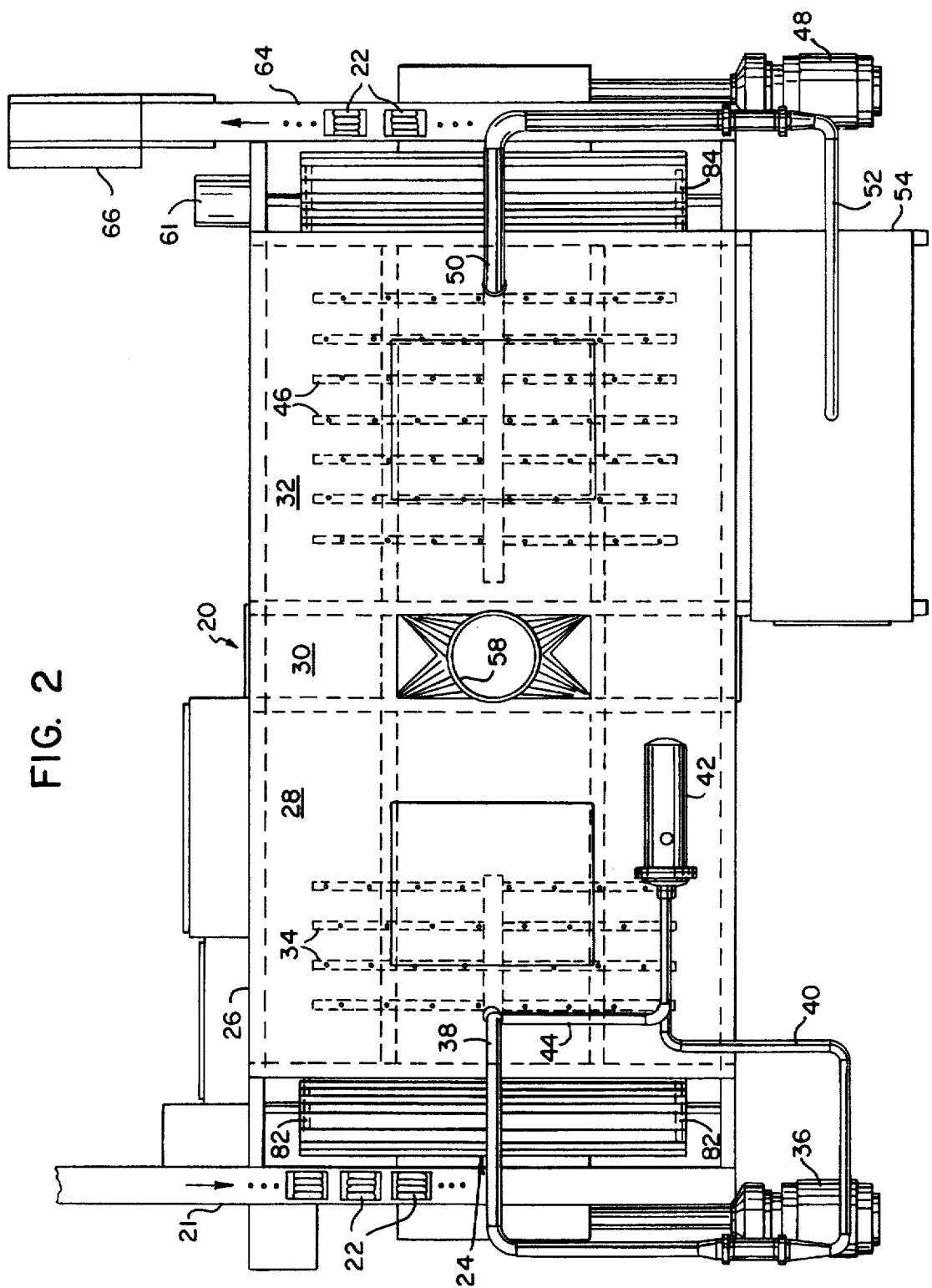
FIG. 2 is a top view of the structure of FIG. 1.

FIGS. 1 and 2 show a meat product pasteurizer 20. A conveyor 21, driven by a motor 23, FIG. 5, transports a plurality of already-cooked and packaged meat products 22 to a loading station 24. In the example shown, each package 22 contains four hot dogs. A pasteurizing processing chamber 26 includes a fluid media heating zone 28, a void zone 30 with no fluid media heating or cooling, and a fluid media chilling zone 32. The fluid media heating zone uses standard, known components, and will be only briefly described. A plurality of headers 34 discharge hot water or the like in a spray falling onto the food product passing through the chamber and transfers heat to such product by contact therewith. The water is collected in the bottom of the chamber and pumped out by pump 36 which sends a portion of the water via line 38 to the headers and a portion of the water via line 40 to a heat exchanger 42 for reheating. The heated water is then sent via line 44 joined to line 38 for remixing prior to entering the headers. Chilling zone 32 uses standard, known components, and will only be briefly described. Headers 46 discharge cooling fluid media, such as sodium chloride brine, water, or glycol, in a spray onto the food product passing through the chamber to cool the food product. The cooling fluid is collected in the bottom of the chamber and pumped out by pump 48. A portion of the cooling fluid is returned from the pump via line 50 to the headers, and a portion of the fluid is supplied via line 52 to heat exchanger 54, FIG. 3, to rechill the fluid and return same via line 56 to the chamber. Void zone 30 includes an exhaust outlet 58 permitting the escape of heat from the food products after leaving heating zone 28 and before entering chilling zone 32.

Figure 5:
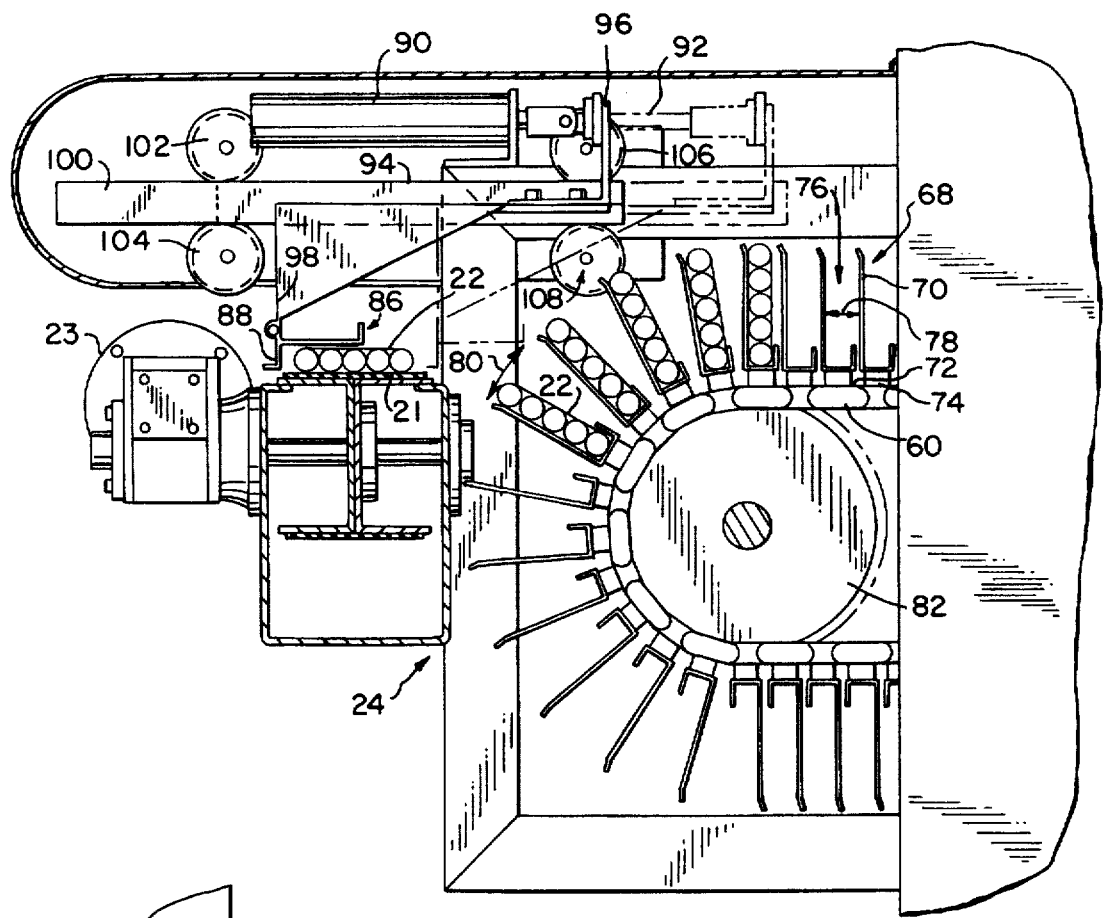
FIG. 5 is an enlarged view of a portion of the structure of FIG. 1 at the loading station.
Figure 6:
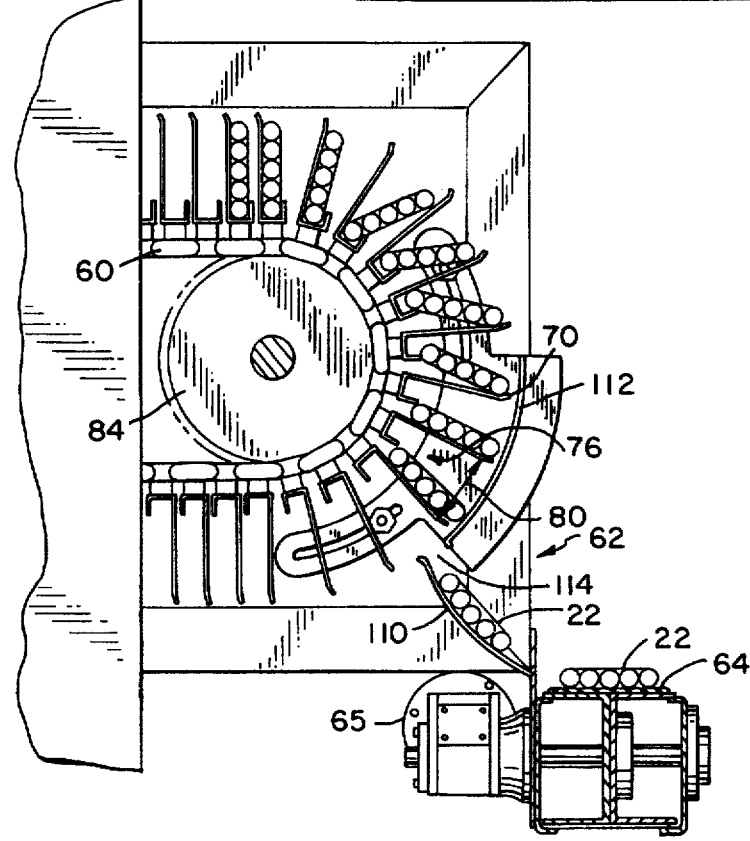
FIG. 6 is an enlarged view of a portion of the structure of FIG. 1 at the unloading station.

A conveyor 60, FIGS. 1, 5 and 6, driven by motor 61, FIG. 2, transports the meat product from loading station 24 through heating zone 28, then through void zone 30, then through chilling zone 32 to an unloading station 62. A conveyor 64, FIGS. 2, 3 and 6, driven by motor 65, FIG. 8, transports the meat product from unloading station 62 to a blow-off station 66, FIGS. 3 and 7, to be described, for removing surface fluid from the packaged meat product 22.

Conveyor 60, FIGS. 1 and 5, has a plurality of flights 68 formed by paddles 70 extending from a conveyor belt 72 having mounting blocks 74 for the paddles. The flights define pockets 76 receiving the meat product 22 between adjacent paddles. The pockets have a first narrow width 78 during the conveyor run through heating zone 28 and through void zone 30 and through chilling zone 32. The pockets have a wider width 80 at the loading and unloading stations. The conveyor belt is provided by a pair of chains extending around a pair of sprockets 82 at the loading station and a pair of sprockets 84 at the unloading station.

A transfer mechanism 86, FIGS. 1 and 5, at the loading station transfers meat product 22 from conveyor 21 to conveyor 60 while pockets 76 are at their wider width 80. Conveyor 21 is provided by a conveyor belt traversing perpendicularly to conveyor 60 and serially carrying meat products 22, FIG. 2. Transfer mechanism 86 includes a pusher bar 88, FIG. 5, driven by pneumatic cylinder 90 between the solid and dashed line positions shown in FIG. 5. The pusher bar has a travel stroke in a direction perpendicular to the direction of travel of meat product 22 on conveyor 21. Pusher bar 88 pushes a plurality of meat products 22 in parallel from conveyor 21 into a widened pocket 76 of conveyor 60. Pneumatic cylinder 90 has a plunger 92 movable right and left in FIG. 5 between the solid and dashed line positions shown. A carriage 94 has an upper arm 96 connected to plunger 92, and a lower arm 98 extending to pusher bar 88. The carriage includes a rail 100 supported between rollers 102 and 104 and rollers 106 and 108, and movable right and left between the solid and dashed line positions shown in FIG. 5 in response to movement of plunger 92, to in turn move pusher bar 88 left and right, to perform the noted loading function.

At unloading station 62, FIGS. 1 and 6, meat product 22 falls by gravity from a widened pocket 76 onto conveyor 64. Conveyor 64 is spaced below and beyond conveyor 60. A discharge guide chute 110 extends between conveyors 60 and 64 and catches meat product 22 as it falls out of pocket 76 and guides the meat product onto conveyor 64. An arcuate discharge guide chute 112 extending generally parallel to the direction of movement of conveyor 60 around sprocket 84 at the unloading station is spaced slightly outwardly of paddles 70. Chute 112 is spaced above chute 110 by a gap 114 therebetween. Chute 112 stops meat product 22 from falling completely out of a respective pocket 76 until the pocket has traversed beyond chute 112 and into alignment with gap 114.

Figure 3:
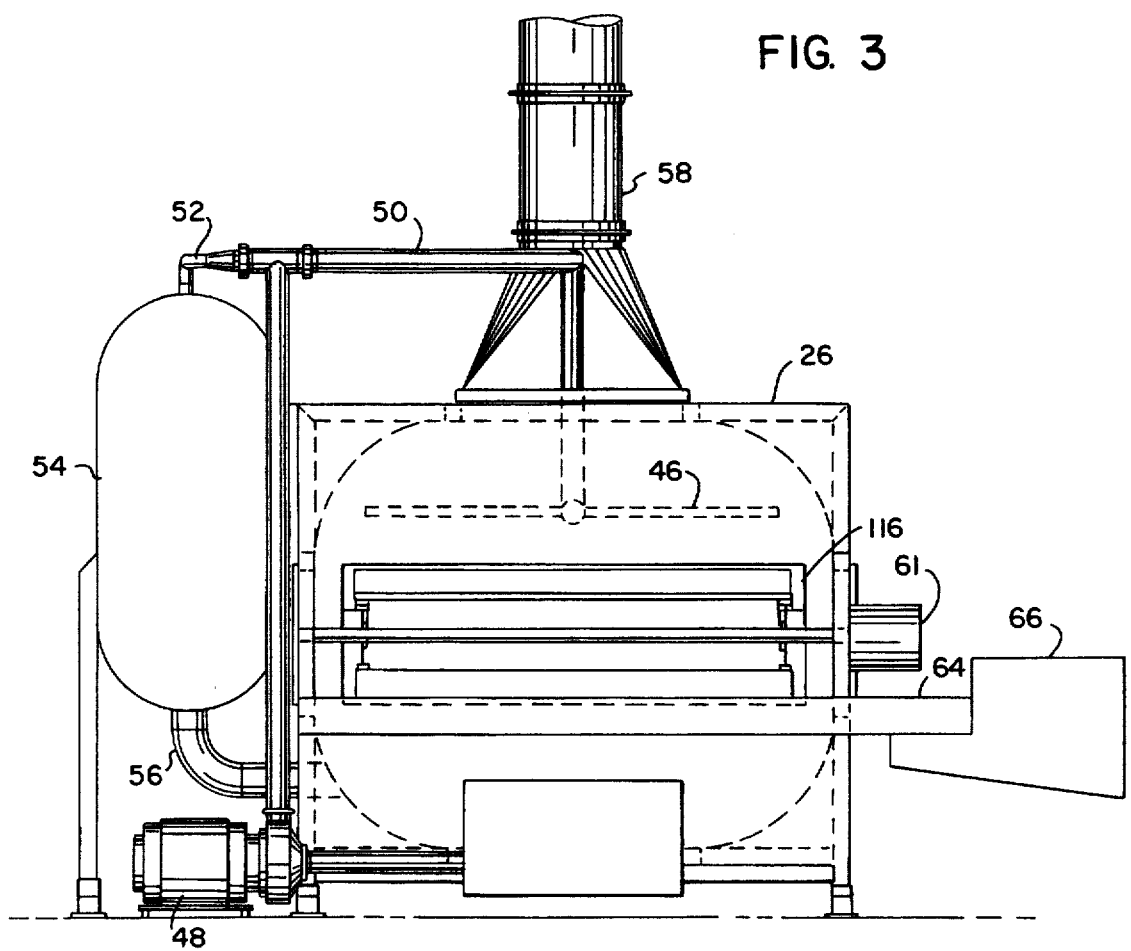
FIG. 3 is an end view of the structure of FIG. 1.
Figure 4:
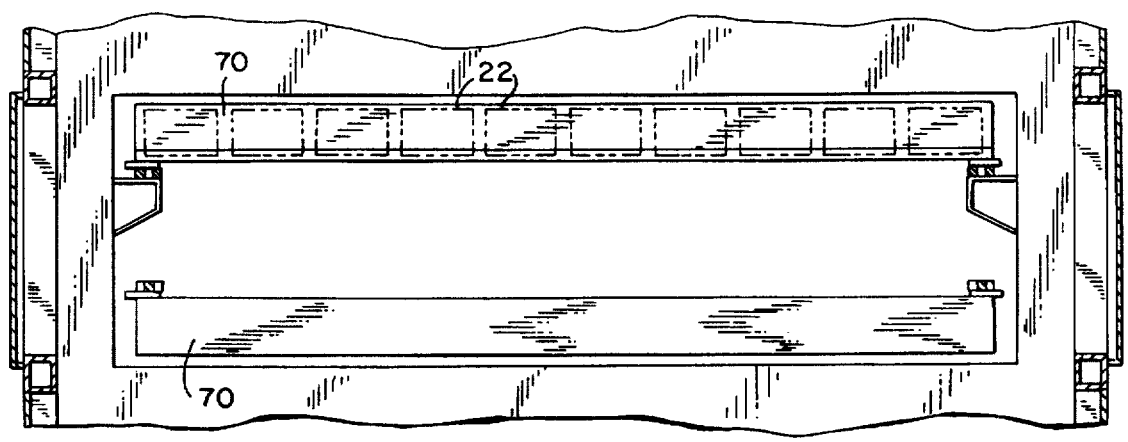
FIG. 4 is a view taken along line 4—4 of FIG. 1.

Heating zone 28 and chilling zone 32 have entrance and exit doorways through which conveyor 60 passes, for example doorway 116, FIG. 3. Paddles 70 additionally function as sealing doors in such doorways by substantially filling the doorway as the paddle passes therethrough, to provide sealing between zones.

Each paddle 70 has a base portion 118, FIG. 15, attached by spacer block 74 to conveyor 60, and a leg 120 extending therefrom. In the embodiment in FIGS. 1, 5, 6, and 15, all paddles are oriented alike such that the leg 122, FIG. 15, of a first paddle 124 is spaced from the leg 126 of a second paddle 128 by the base 130 of first paddle 124 therebetween, and the leg 126 of the second paddle 128 is spaced from the leg 132 of a third paddle 134 by the base 136 of the second paddle 128 therebetween, and so on. In the preferred embodiment, each paddle is a J-shaped member having a central bight provided by base 118 secured to conveyor 60 at spacer block 74, a first leg provided by leg 120 extending therefrom, and a second shorter leg 138 extending therefrom and spaced from leg 120. All of the J-shaped paddles are oriented alike as shown in FIG. 15 such that the second shorter leg 138 faces the first longer leg of the next paddle.

In another embodiment, FIG. 17, the paddles are oriented in opposite pairs such that the leg 140 of a first paddle 142 is spaced from the leg 144 of a second paddle 146 by the base 148 of the first paddle 142 and by the base 150 of the second paddle 146 therebetween, and the leg 144 of the second paddle 146 faces the leg 152 of a third paddle 154 with no paddle base therebetween, and the leg 152 of the third paddle 154 is spaced from the leg 156 of a fourth paddle 158 by the base 160 of the third paddle 154 and by the base 162 of the fourth paddle 158 therebetween, and so on. The embodiment in FIG. 17 provides wider pockets in the flights, to accommodate larger meat products 164, for example a ham, as compared to the narrower meat products 122, for example hot dogs, accommodated in the narrower pockets provided by the flights in FIG. 15.

In another alternate embodiment, providing yet wider pockets accommodating even wider meat products 166, FIG. 18, some paddles are removed, and the paddles are oriented in opposite pairs and have alternating larger and smaller gaps 168 and 170, respectively, therebetween. Leg 172 of a first paddle 174 is spaced from the leg 176 of a second paddle 178 by the base 180 of the first paddle 174, the noted larger gap 168, and the base 182 of the second paddle 178 therebetween. Leg 176 of second paddle 178 is spaced from the leg 184 of a third paddle 186 by the noted smaller gap 170 therebetween. Leg 184 of third paddle 186 is spaced from the leg 188 of a fourth paddle 190 by the base 192 of the third paddle 186, the noted larger gap 168, and the base 194 of the fourth paddle 190 therebetween, and so on.

The invention provides a simple and effective method for processing differing size food products. A first narrow size product is processed in accordance with FIG. 15 by attaching the paddle bases to the conveyor in like orientation such that the leg of a first paddle is spaced from the leg of a second paddle by the base of the first paddle therebetween, the leg of the second paddle is spaced from the leg of a third paddle by the base of the second paddle therebetween, and so on. A second wider size food product is processed as shown in FIG. 17 by reorienting the paddles on the conveyor in opposite pairs such that the leg of a fourth paddle is spaced from the leg of a fifth paddle by the base of the fourth paddle and by the base of the fifth paddle therebetween, the leg of the fifth paddle faces the leg of a sixth paddle with no paddle base therebetween, the leg of the sixth paddle is spaced from the leg of a seventh paddle by the base of the sixth paddle and the base of the seventh paddle therebetween, and so on. A third size food product, wider than the noted second size food product of FIG. 17, is processed as shown in FIG. 18 by further reorienting the paddles and removing some paddles so that the paddles are oriented in opposite pairs and have alternating larger and smaller gaps therebetween, such that the leg of an eighth paddle is spaced from the leg of a ninth paddle by the base of the eight paddle, the noted larger gap, and the base of the ninth paddle therebetween, the leg of the ninth paddle is spaced from the leg of a tenth paddle by the noted smaller gap therebetween, the leg of the tenth paddle is spaced from the leg of an eleventh paddle by the base of the tenth paddle, the noted larger gap, and the base of the eleventh paddle therebetween, and so on.

Blow-off station 66 includes a conveyor 196, FIGS. 7 and 8, having a plurality of parallel longitudinally extending belts 200 transporting meat product 22 along a longitudinal run 201, namely left to right in FIGS. 7 and 8. The belts have a continuous longitudinal extension along such run without lateral cross-belts therebetween. In the prior art, FIGS. 10 and 11, longitudinal belts 202 at a blow-off station have cross-belts 204 extending laterally therebetween.

A plurality of air knife jets 206, 208, 210, 212, FIGS. 7 and 9, blow air along belts 200 such that air flows continuously longitudinally along the noted longitudinal run 201 and sweeps liquid therealong with minimum interruption and excess fluid build-up, and minimizing backside inaccessible contact areas facing in the same direction as the air flow. In the prior art, FIG. 11, cross-belts 204 interrupt air flow along longitudinal belts 202 and may cause excess fluid build-up. Furthermore, such cross-belts present backside inaccessible contact areas such as at 214 facing in the same direction as the air flow along the longitudinal belts, which backside contact area may carry fluid therewith as at 216 during the return travel of the belts, thus preventing complete drying, and carrying fluid to the next batch of food products, and preventing full reclamation of fluid if desired. Belts 200, FIG. 8, traverse around pulleys on shafts 218, 220 and 222, FIGS. 7 and 8, and are driven from shaft 222 which in turn is driven by a belt 224 on a shaft 226 driven from motor 65 which also drives conveyor 64. The noted longitudinal run 201 is between the pulleys on shafts 222 and 220.

Packaged meat product 22 rests on top of and spans a plurality of belts 200 along the noted longitudinal run 201. Air knife jets 206 and 208, FIGS. 7 and 9, are above the longitudinal run 201 and direct air downwardly and longitudinally therealong in a direction opposite to the direction of travel of the meat product 22 therealong. Air knife jets 210 and 212 are below the noted longitudinal run 201 and direct air upwardly and longitudinally therealong in a direction opposite to the direction of travel of meat product 22 therealong. The air knife jets are staggered such that the air flow direction vector from each respective air knife jet does not intersect the air flow direction vector from any of the remaining three air knife jets.

Figure 12:
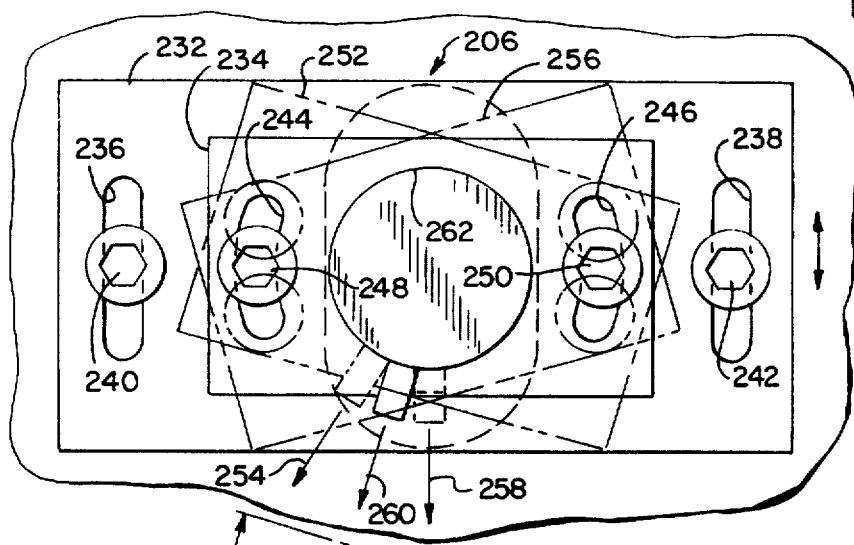
FIG. 12 is an enlarged view of a portion of the structure of FIG. 9.
Figure 13:
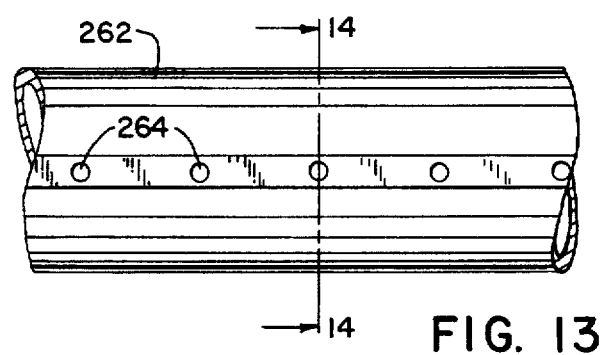
FIG. 13 is a view taken along line 13—13 of FIG. 12.
Figure 14:
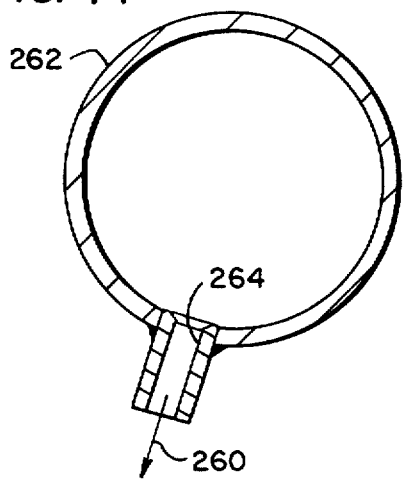
FIG. 14 is a sectional view taken along line 14—14 of FIG. 13.
Figure 16:
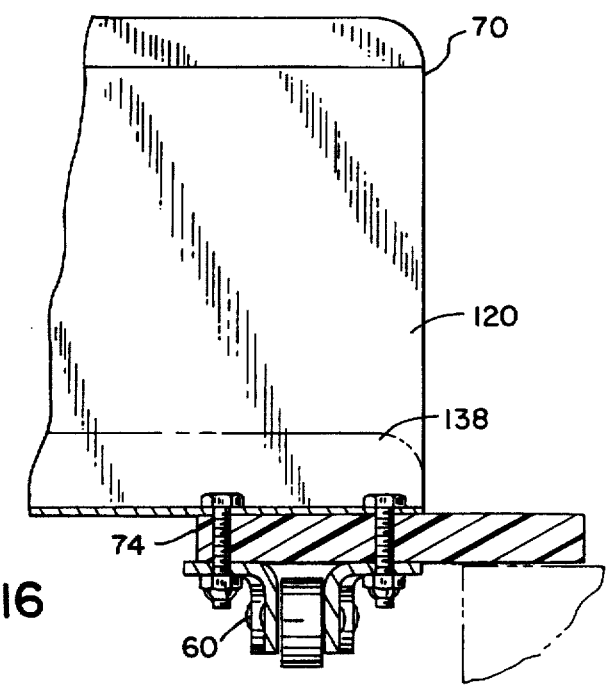
FIG. 16 is a view taken along line 16—16 of FIG. 15.

Each air knife jet has first and second mounting plates, such as shown at 232 and 234, FIG. 12. Mounting plate 232 has a pair of vertical mounting slots 236 and 238, and respective mounting bolts 240 and 242 extending therethrough, for adjusting the vertical position of the air knife jet relative to the noted longitudinal run 201 of meat product 22 along belts 200. Mounting plate 234 has a pair of arcuate mounting slots 244 and 246, and respective mounting bolts 248 and 250 extending therethrough, for adjusting the angle of air flow from the air knife jet relative to the direction of travel of food product 22 along the noted longitudinal run 201. FIG. 12 shows mounting plate 234 rotated clockwise to a position shown in dashed line at 252 to yield air flow direction 254. FIG. 12 also shows mounting plate 234 rotated counterclockwise to a position shown in dashed line at 256, yielding air flow direction 258. FIG. 12 also shows mounting plate 234 in a central position as shown in solid line, yielding air flow direction 260. Each air knife jet is provided by a tubular member 262, FIG. 13, having a plurality of outlet orifices 264 directing air flow therethrough along the directional vector such as shown at 260.

Blow-off station 66 includes a blow-off chamber 266, FIG. 7. Conveyor 196 transports packaged meat product 22 from conveyor 64 through chamber 266. A demisting filter 268 has an inlet 270 from an upper portion of chamber 266, and an air outlet 272 passing filtered air with fluid removed therefrom. A vacuum air pump 274 has an inlet 276 from the demisting filter air outlet, and an outlet 278 to air knife jets 206, 208, 210, 212. Filter 268 filters out fluid and supplies demisted air to air outlet 272. The fluid which is filtered out is supplied from the fluid outlet 280 of the filter back to chilling zone 32 of the processing system, to reclaim such fluid, which is desirable when expensive coolant such as glycol is used.

It is recognized that various equivalents, alternatives and modifications are possible within the scope of the appended claims.

I claim:

1. A meat product pasteurizer comprising in combination:
    a first conveyor transporting a cooked and packaged seat product to a loading station;
    a pasteurizing processing chamber comprising a fluid media heating zone, an intermediate zone, and a fluid media chilling zone, said intermediate zone being located between said heating zone and said chilling zone;
    a second conveyor transporting said meat product from said loading station through said heating zone, then through said intermediate zone, and then through said chilling zone to an unloading station;
    a third conveyor transporting said meat product from said loading station to a blow-off station for removing surface fluid from said packaged meat product,
    wherein said second conveyor comprises a plurality of flights formed by paddles extending from a conveyor belt and defining pockets receiving said meat product between adjacent paddles, said pockets having a first narrow width during the conveyor run through said heating zone and through said intermediate zone and through said chilling zone, and having a second wider width at said loading and unloading stations.

2. The invention according to claim 1 comprising a transfer mechanism at said loading station transferring said meat product from said first conveyor to said second conveyor while said pockets are at said wider width, and wherein said meat product at said unloading station falls by gravity from a widened said pocket onto said third conveyor.

3. The invention according to claim 2 wherein said third conveyor is spaced below and beyond said second conveyor, and comprising a first discharge guide chute extending between said second and third conveyors and catching said meat product as it falls out of said pocket and guiding said meat product onto said third conveyor, and comprising a second discharge guide chute spaced slightly outwardly of said paddles at said unloading station, and spaced above said first chute by a gap therebetween, said second chute stopping said meat product from falling completely out of a respective said pocket until the pocket has traversed beyond said second chute and into alignment with said gap between said first and second chutes.

4. The invention according to claim 1 wherein said first conveyor comprises a conveyor belt traversing perpendicularly to said second conveyor and serially carrying cooked and packaged meat products, and a transfer mechanism comprising a pusher bar having a travel stroke in a direction perpendicular to the direction of travel of said meat product along said first conveyor and pushing a plurality of meat products in parallel from said first conveyor onto said second conveyor.

5. The invention according to claim 1 wherein said heating zone and said chilling zone have entrance and exit doorways through which said second conveyor passes, and wherein said paddles additionally function as sealing doors in said doorways by substantially filling said doorways as said paddles pass therethrough, to provide sealing between said zones.

6. A meat product pasteurizer comprising in combination:
    a first conveyor transporting a cooked and packaged meat product to a loading station;
    a pasteurizing process chamber comprising a fluid media heating zone, an intermediate zone, and a fluid media chilling zone, said intermediate zone being located between said heating zone and said chilling zone;
    a second conveyor transporting said meat product from said loading station through said heating zone, then through said intermediate zone, and then through said chilling zone to an unloading station;
    a third conveyor transporting said meat product from said unloading station to a blow-off station for removing surface fluid from said packaged meat product,
    wherein said blow-off station comprises a conveyer having a plurality of parallel longitudinally extending belts transporting said meat product along a longitudinal run, said belts having a continuous longitudinal extension along said run without lateral cross-belts therebetween, and a plurality of air knife jets blowing air along said belts such that air flows continuously longitudinally along said longitudinal run and sweeps liquid therealong with minimum interruption and excess fluid build-up, and minimizing backside inaccessible contact areas facing in the same direction as the air flow.

7. The invention according to claim 6 wherein said packaged meat product rests on top of and spans a plurality of said belts along said longitudinal run, and comprising at least one air knife jet above said longitudinal run and directing air downwardly and longitudinally therealong in a direction opposite to the direction of travel of said meat product therealong, and comprising at least one air knife jet below said longitudinal run and directing air upwardly and longitudinally therealong in a direction opposite to the direction of travel of said meat product therealong.

8. A meat product pasteurizer comprising in combination:
    a first conveyer transporting a cooked and packaged meat product to a loading station;
    a pasteurizing processing chamber comprising fluid media heating zone, an intermediate zone, and a fluid media chilling zone, said intermediate zone being located between said heating zone and said chilling zone;

a second conveyer transporting said meat product from said loading station through said heating zone, then through said intermediate zone, and then through said chilling zone to an unloading station;

a third conveyor transporting said meat product from said unloading station to a blow-off station for removing surface fluid from said packaged meat product, wherein said blow-off station comprises a blow-off chamber, a fourth conveyer transporting said packaged meat product from said third conveyer through said blow-off chamber, one or more air knife jets blowing air along said packaged meat product to remove surface fluid, a demisting filter having an inlet from an upper portion of said blow-off chamber, and an air outlet passing filtered air with fluid removed therefrom, an air pump having an inlet from said demisting filter air outlet, and an outlet to said air knife jets.

9. A food processing system comprising:

a first conveyor transporting a food product to a loading station;

a second conveyor for transporting said food product from said loading station through a processing chamber to an unloading station, said second conveyor having a plurality of flights formed by paddles defining variable width pockets receiving said food product, said pockets having a first width during the conveyor run between said loading and unloading stations, said pockets having second wider widths at said loading and unloading stations;

a transfer mechanism at said loading station transferring said food product from said first conveyor to said second conveyor while said pockets are at said second wider width;

a third conveyor spaced below and beyond said second conveyor for transporting said food product from said unloading station, said food product falling by gravity from a widened said pocket onto said third conveyor;

a discharge guide chute extending between said second and third conveyors and catching said food product as it falls out of said pocket and guiding said food product onto said third conveyor.

10. The invention according to claim a comprising a second discharge guide chute comprising an arcuate member extending generally parallel to the direction of movement of said conveyor belt at said unloading station and spaced slightly outwardly of said paddles and above said first chute by a gap therebetween, said second chute stopping said food product from falling completely out of a respective said pocket until the pocket has traversed beyond said second chute and into alignment with said gap between said first and second chutes.

11. A food processing system comprising:

a first conveyor transporting a food product to a loading station;

a second conveyor for transporting said food product from said loading station through a processing chamber to an unloading station, said second conveyor having a plurality of flights formed by paddles defining variable width pockets receiving said food product, said pockets having a first width during the conveyor run between said loading and unloading stations, said pockets having second wider widths at said loading and unloading stations, said first conveyor comprising a conveyor belt traversing perpendicularly to said second conveyor and serially carrying food products;

a transfer mechanism at said loading station transferring said food product from said first conveyor to said second conveyor while said pockets are at said second wider width, said transfer mechanism comprising a pusher bar having a travel stroke in a direction perpendicular to the direction of travel of said food product along said first conveyor and pushing a plurality of food products in parallel from said first conveyor into a widened said pocket of said second conveyor.

12. A food processing system comprising:

a first conveyor transporting a food product to a loading station;

a second conveyor for transporting said food product from said loading station through a processing chamber to an unloading station, said second conveyor having a plurality of flights formed by paddles defining variable width pockets receiving said food product, said pockets having a first width during the conveyor run between said loading and unloading stations, said pockets having second wider widths at said loading and unloading stations, said food processing chamber comprising at least two processing zones and at least one doorway therebetween, said paddles substantially filling said doorway as each passes therethrough to provide sealing between said zones;

a transfer mechanism at said loading station transferring said food product from said first conveyor to said second conveyor while said pockets are at said second wider width.

13. A food processing system comprising:

a first conveyor transporting a food product to a loading station;

a second conveyor for transporting said food product from said loading station through a processing chamber to an unloading station, said second conveyor having a plurality of flights formed by paddles defining variable width pockets receiving said food product, said pockets having a first width during the conveyor run between said loading and unloading stations, said pockets having second wider widths at said loading and unloading stations, each paddle comprising a J-shaped member having a central bight secured to said second conveyor, a first leg extending therefrom, and a second shorter leg extending therefrom and spaced from said first leg;

a transfer mechanism at said loading station transfer-ring said food product from said first conveyor to said second conveyor while said pockets are at said second wider width.

14. The invention according to claim 13 wherein in all said J-shaped paddles are oriented alike such that the second leg faces the first leg of the next paddle.

15. A blow-off station for a food processing system comprising a conveyor having a plurality of parallel longitudinally extending belts transporting a food product along a longitudinal run, said belts having a continuous longitudinal extension along said run without lateral cross-belts therebetween, a plurality of air knife jets blowing air along said belts such that air flows continuously longitudinally along said longitudinal run and sweeps liquid therealong with minimum interruption and excess fluid build-up, and minimizing backside inaccessible contact areas facing in the same direction as the air flow.

16. The invention according to claim 15 wherein said food product rests on top of and spans a plurality of said belts along said longitudinal run, and comprising at least one air knife jet above said longitudinal run and directing air downwardly and longitudinally therealong in a direction opposite to the direction of travel of said food product therealong, and comprising at least one air knife jet below said longitudinal run and directing air upwardly and longitudinally therealong in a direction opposite to the direction of travel of said food product therealong.

17. The invention according to claim 16 comprising four said air knife jets, two above and two below said longitudinal run, and staggered such that the air flow direction vector from each respective air knife jet does not intersect the air flow direction vector from any of the remaining three air knife jets.

18. The invention according to claim 15 wherein said air knife jets comprise first and second mounting plates comprising a first mounting plate having at least one vertical mounting slot for adjusting the vertical position of said air knife jet relative to said longitudinal run, and a second mounting plate having at least one arcuate mounting slot for adjusting the angle of air flow from said air knife jet relative to the direction of travel of said food product along said longitudinal run.

19. The invention according to claim 15 wherein said air knife jets are in a blow-off chamber, and comprising a demisting filter having an inlet from an upper portion of said chamber, said filter filtering out fluid and supplying demisted air to an air outlet, an air pump having an inlet from said demisting filter air outlet, and an outlet to said air knife jets.

20. A reclamation and recirculation system for a blow-off station for a food processing system comprising a chamber, a conveyor transporting a food product having surface fluid thereon through said chamber, one or more air knife jets blowing air along said food product to remove said surface fluid, a demisting filter having an inlet from an upper portion of said chamber, a fluid outlet supplying filtered-out fluid back to said processing system, and an air outlet outputting demisted air, and an air pump having an inlet from said demisting filter air outlet, and an outlet to said air knife jets.

* * * * *

UNITED STATES PATENT AND TRADEMARK OFFICE
CERTIFICATE OF CORRECTION

PATENT NO. : 5,551,334
DATED : September 3, 1996
INVENTOR(S) : DANIEL J. CODY

It is certified that error appears in the above-identified patent and that said Letters Patent is hereby corrected as shown below:

In The Claims

Claim 1, column 5, line 37, delete "seat" and substitute therefor -- meat --; Claim 1, column 5, line 50, delete "loading" and substitute therefor -- unloading --; Claim 6, column 6, line 30, delete "process" and substitute therefor -- processing --; Claim 10, column 7, line 47, delete "a" (first occurrence) and substitute therefor -- 9 --; Claim 13, column 8, line 48, delete "transfer-ring" and substitute therefor -- transferring --; Claim 14, column 8, line 52, after "wherein" delete "in".

Signed and Sealed this

Tenth Day of December, 1996

Attest:

BRUCE LEHMAN

*Attesting Officer*    *Commissioner of Patents and Trademarks*